United States Patent
Lee (10) Patent No.: US 6,959,072 B1
(45) Date of Patent: Oct. 25, 2005

(54) APPARATUS AND METHOD FOR RECORDING/REPRODUCING VOICE MESSAGE IN EXCHANGE SYSTEM HAVING INTERNET GATEWAY

(75) Inventor: Jun-Seo Lee, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/456,265

(22) Filed: Dec. 7, 1999

(30) Foreign Application Priority Data

Dec. 7, 1998 (KR) ................................ 1998-53423

(51) Int. Cl.[7] .............................................. H04M 1/64
(52) U.S. Cl. .................. 379/76; 379/88.25; 379/88.17; 379/900
(58) Field of Search ............................ 379/67.1, 88.17, 379/88.22, 88.07, 68, 88.1, 88.25, 76

(56) References Cited

U.S. PATENT DOCUMENTS

| | | | | |
|---|---|---|---|---|
| 5,909,387 A | * | 6/1999 | Wong et al. | 365/45 |
| 5,946,386 A | * | 8/1999 | Rogers et al. | 379/265.09 |
| 6,064,653 A | * | 5/2000 | Farris | 370/237 |
| 6,215,858 B1 | * | 4/2001 | Bartholomew et al. | 379/88.17 |
| 6,282,269 B1 | * | 8/2001 | Bowater et al. | 379/88.17 |
| 6,426,942 B1 | * | 7/2002 | Sienel et al. | 370/235 |
| 6,452,937 B1 | * | 9/2002 | Borkovic et al. | 370/442 |

* cited by examiner

*Primary Examiner*—Fan Tsang
*Assistant Examiner*—Olisa Anwah
(74) *Attorney, Agent, or Firm*—Cha & Reiter, L.L.C.

(57) ABSTRACT

An apparatus and method for recording/reproducing voice messages using an internet gateway without separately procuring a VMS (Voice Mailing System). Upon receiving the voice message from a subscriber, the voice message is compressed in a data compressor of a digital signal processor (DSP) and stored in a flash memory. Then, the voice message is stored in a buffer of the DSP at a predetermined time interval, and subsequently read and decompressed by a data decompressor, and thereafter reproduced to a calling subscriber.

21 Claims, 9 Drawing Sheets

| DSP | PORT | STATE |
|---|---|---|
| DSP 1 | 1<br>2<br>3<br>4 | ENABLE<br>BUSY<br>FAULT<br>ENABLE |
| DSP 2 | 5<br>6<br>7<br>8 | ⋮ |
| DSP 3 | 9<br>10<br>11<br>12 | ⋮ |
| DSP 4 | 13<br>14<br>15<br>16 | ⋮ |

FIG. 3A

| STATE | EVENT |
|---|---|
| SEIZURE | ANNOUNCEMENT MSG #1, 2, 3, 4 |

VOICE MESSAGE 1 : HELLO, THIS IS SS CORPORATION
VOICE MESSAGE 2 : ENTER USER ID
VOICE MESSAGE 3 : ENTER PASSWORD
VOICE MESSAGE 4 : ENTER CALLED NUMBER

FIG. 5A

| MESSAGE NUMBER | MESSAGE |
|---|---|
| VOICE MESSAGE 1 | HELLO, THIS IS SS CORPORATION |
| VOICE MESSAGE 2 | ENTER USER ID |
| VOICE MESSAGE 3 | ENTER PASSWORD |
| VOICE MESSAGE 4 | ENTER CALLED NUMBER |

FIG. 5B

| MESSAGE NUMBER | MESSAGE |
|---|---|
| VOICE MESSAGE 1 | HELLO, THIS IS SS CORPORATION [EOF] |
| VOICE MESSAGE 2 | ENTER USER ID [EOF] |
| VOICE MESSAGE 3 | ENTER PASSWORD [EOF] |
| VOICE MESSAGE 4 | ENTER CALLED NUMBER [EOF] |

APPARATUS AND METHOD FOR RECORDING/REPRODUCING VOICE MESSAGE IN EXCHANGE SYSTEM HAVING INTERNET GATEWAY

CLAIM OF PRIORITY

This application makes reference to, incorporates the same herein, and claims all benefits accruing under 35 U.S.C. Section.119 from an application for DEVICE AND METHOD FOR RECORDING/REPRODUCING VOICE MESSAGE IN EXCHANGE SYSTEM HAVING INTERNET GATEWAY filed earlier in the Korean Industrial Property Office on Dec. 7, 1998 and there duly assigned Serial No. 98-53423.

BACKGROUND OF THE INVENTION

1. Field of the Invention

The present invention relates to a private automatic branch exchange (PABX) having an internet gateway, and more particularly, to an apparatus and method for recording and reproducing an outgoing voice message.

2. Description of the Related Art

Figure 1:
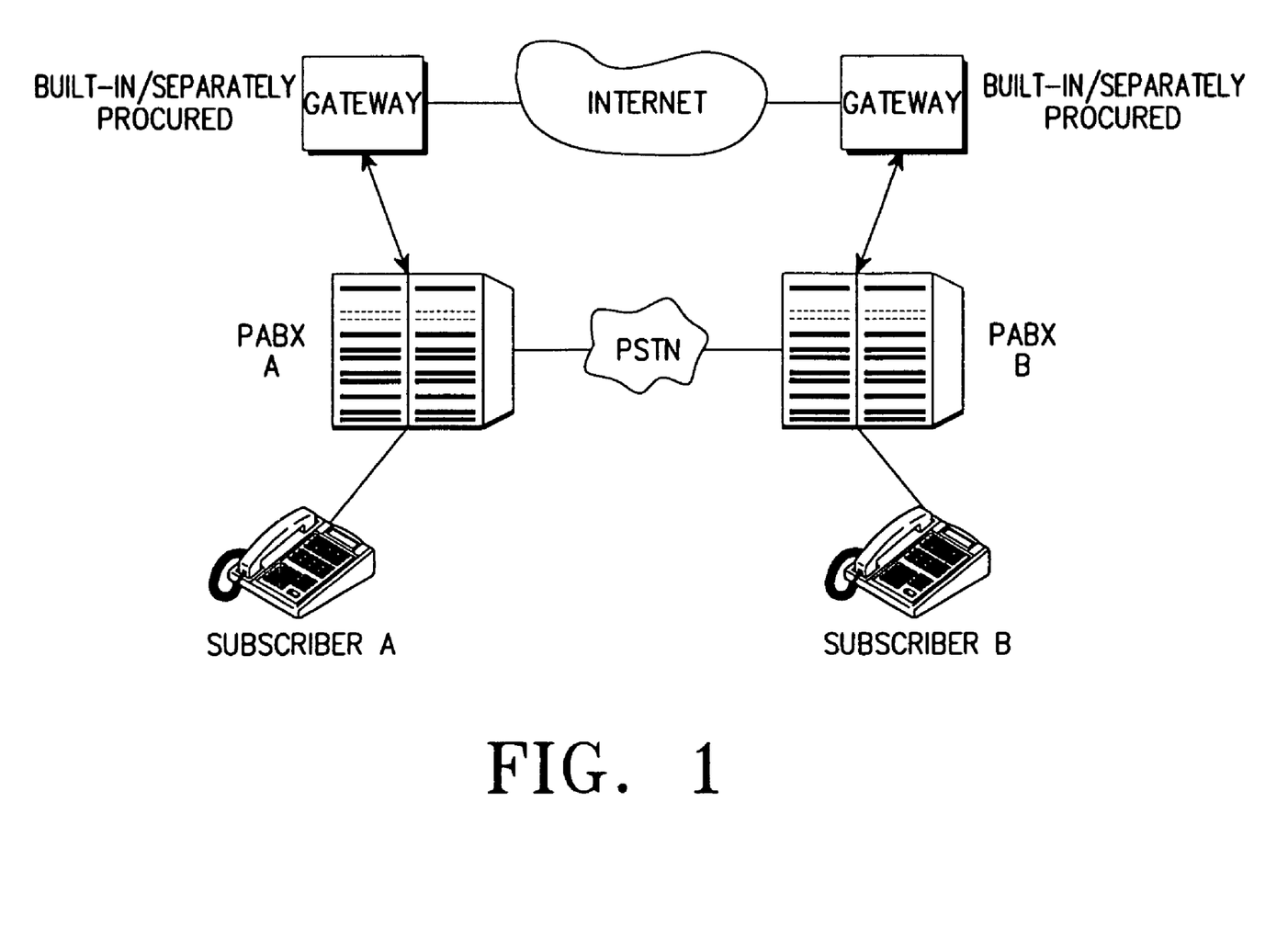
FIG. 1 schematically illustrates PABXs each having an internet gateway according to the present invention.

A typical PABX system is connected to a public switched telephone network (PSTN) for affecting the central office line communication loop and the internal communication loop. As the internet becomes popular, the PABX has evolved in a direction to provide voice and data service to subscribers of the internet as well as the PSTN. The "Internet Gateway" connects the PABX to the internet and allows the PABX to provide internet service to subscribers. Such PABXs are configured as shown in FIG. 1. In this diagram, the PABXs A and B are connected to the internet via a built-in or a separately procured gateway and coupled to the PSTN for providing voice and data services to subscribers A and B.

The PABX has been developed to offer subscribers with more services. A major illustrative example is a voice message feature used to make an announcement or automatic answering service to subscribers. This service is achieved by a voice mailing system (VMS) that is linked to the exchange system.

In order to provide the voice message as an announcement or automatic answering message, the conventional PABX requires a VMS, which is connected to the exchange system, and the voice message must be pre-recorded in the VMS. Such implementation is not economical or convenient. Further, the VMS recording is performed based on the PCM (Pulse Code Modulation) technique according to the ITU-T Recommendation G.711, thus producing an undesirably large amount of data. As a result, the memory is not used efficiently.

SUMMARY OF THE INVENTION

One of the objects of the present invention, therefore, is to provide an apparatus and method for recording/reproducing an outgoing voice message in the PABX, that obviate the economic constraint imposed by separately procuring the VMS.

Another object of the present invention is to provide an apparatus and method for recording/reproducing an outgoing voice message in the PABX that eliminate the inconvenience of having the VMS component connected to the PABX.

A further object of the present invention is to provide an apparatus and method for recording/reproducing an outgoing voice message in the PABX that ensure the efficient use of the memory.

To achieve the above stated objects, the present invention provides an apparatus for recording a voice message to be announced in response to an incoming call to the exchange system. According to one aspect of the present invention, the voice recording apparatus includes a subscriber telephone unit for entering the subscriber voice message and an internet gateway for recording the subscriber voice message that are received from the subscriber telephone unit. The internet gateway includes a DSP that supports a plurality of ports as data transmitting/receiving paths; a data compressor for compressing the voice data received, message by message; a call processor for establishing a call connection between the telephone and the internet gateway when the telephone is in off-the-hook position and outputting the information, indicating which port is available among the DSP ports; a DSP manager for operating the corresponding DSP port based on the received port information; a flash memory for storing the compressed voice data; and, a controlling circuit for controlling the stored characteristics of the compressed data to be stored as the voice message in the flash memory.

The data compressor compresses the voice data, message by message, using one of the algorithms set forth in G.723.1 and G.729. The controlling circuit stores the voice data that is compressed, message by message, using the data compressor in a file in the flash memory in response to a subscriber request for termination of the voice recording. The controlling circuit also merges and EDF (End-of-File) marks the compressed voice data stored in the flash memory, message by message.

Another aspect of the present invention provides an apparatus for reproducing a voice message to be announced in response to an incoming call to the exchange system. The apparatus for reproducing the outgoing voice message includes an office line telephone or an extension telephone, and an internet gateway for broadcasting the outgoing voice message when the telephone is in the hook-off position. The internet gateway includes a flash memory for storing the compressed voice data having at least one message; a DSP having a buffer and a data decompressor for decompressing the voice message stored in the buffer, for supporting a plurality of ports as data transmitting/receiving paths, and for outputting the decompressed voice message through one of the ports when the port is driven; a controlling circuit for controlling the corresponding voice message included in the voice data stored in the flash memory to be read and written to/from the buffer in response to the hook-off position of the telephone; a call processor for establishing a call connection between the subscriber telephone and the internet gateway upon the hook-off position of the telephone, determining which DSP port is available, and outputting the port information and the number of the corresponding voice message; and, a DSP manager for operating the corresponding DSP port based on the port information.

The data decompressor decompresses the voice data, message by message, using one of the G.723.1 and G.729 algorithms. The controlling circuit receives information about the number of the corresponding voice message with respect to the hook-off of the telephone from the call processor, reads the corresponding voice message, and controls the voice message to be written in the buffer at a predetermined time interval (every 30 milliseconds).

A BRIEF DESCRIPTION OF THE DRAWINGS

The above objects and advantages of the present invention will become more apparent with reference to the attached drawings in which.

A DETAILED DESCRIPTION OF THE PREFERRED EMBODIMENT

The preferred embodiments of the present invention will be described in detail with reference to the attached drawings. For the purpose of clarity, a detailed description of well known functions or structures of the present invention will be omitted if it is deemed to obscure the subject matter of the present invention.

The present invention records and reproduces outgoing voice messages using an internet gateway having a digital signal processor (DSP) which interface with the internet, without having a separate voice mail service (VMS) component. The internet gateway in accordance with the present invention can be used for recording/reproducing the outgoing voice message and for interfacing with the internet.

Figure 2:
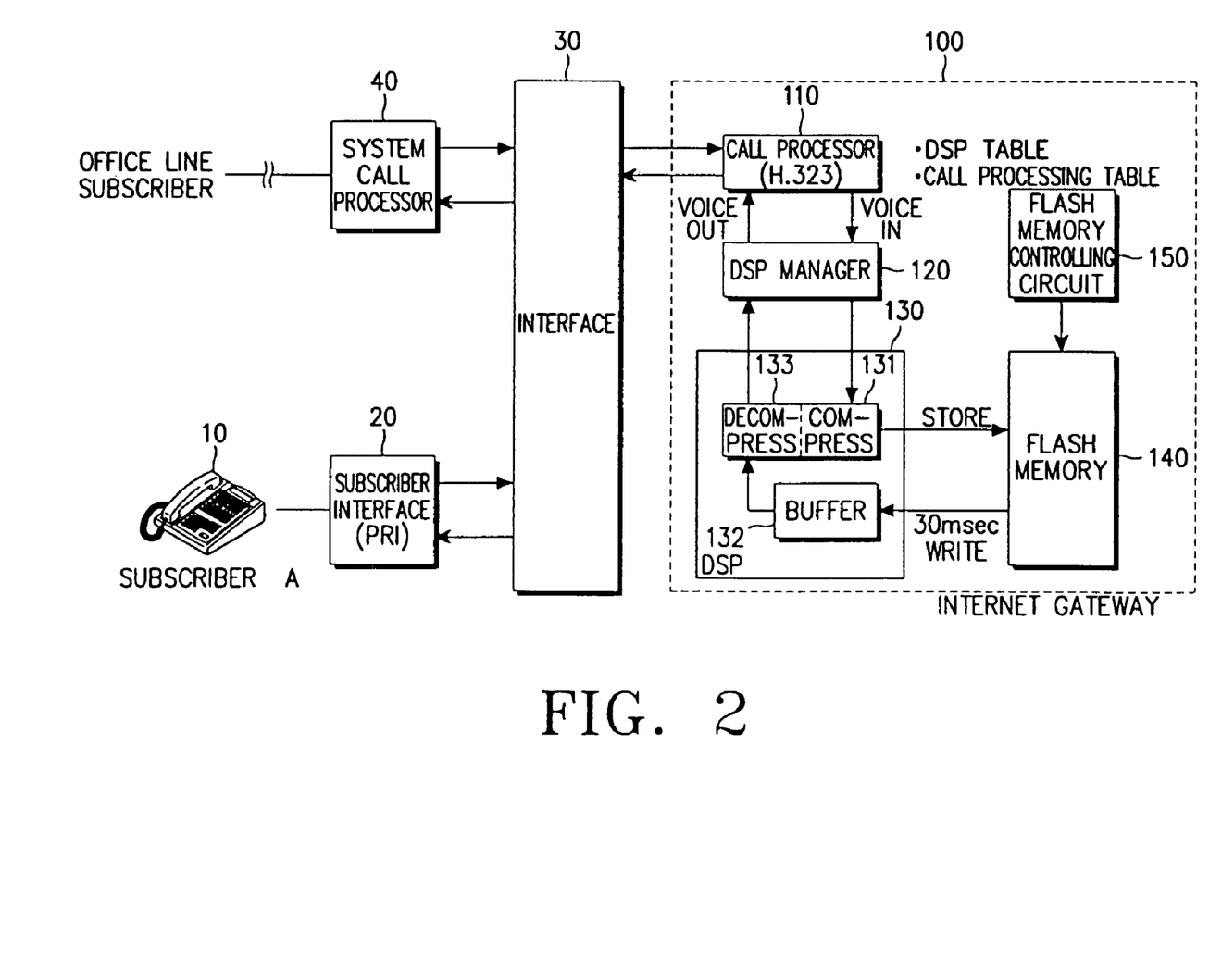
FIG. 2 illustrates a block diagram of a voice message recording/reproducing apparatus according to the present invention.

FIG. 2 depicts a block diagram in accordance with the present invention for recording and reproducing the outgoing voice messages. In FIG. 2, the apparatus includes an internet gateway 100, a subscriber telephone 10, a subscriber interface 20, an interface 30, and a system call processor 40. The subscriber telephone 10, the subscriber interface 20, the interface 30, and the system call processor 40 are generally found in the PABX; however, the internet gateway 100 is a unique feature included in the PABX in accordance with the present invention and serves to access the internet. The subscriber interface 20 can be a primary rate interface (PRI) to interface with the subscriber telephone 10. A voice message is entered through the subscriber telephone 10 and recorded in the flash memory 140 of the internet gateway 100. Similarly, the pre-recorded voice message can be retrieved from the flash memory 140 and transmitted to the subscriber telephone 10. The interface 30 interfaces with the components of the PABX. For example, the interface 30 interfaces between the subscriber interface 20 and the system call processor 40, between the subscriber interface 20 and the internet gateway 100, and between the system call processor 40 and the internet gateway 100. The system call processor 40 processes the office line call, the extension call, or the call over the internet in the PABX, and the system controller and the switching circuit of the PABX generally perform the processing functions of various calls received therein.

In response to a call origination, the internet gateway 100 can record a voice message and thereafter transmits the voice message to the calling subscriber as occasion demands. For example, an outgoing voice message can be recorded via the subscriber telephone 10, and upon receiving a call request, the outgoing voice message can be transmitted to the office line subscriber via system call processor 40 or to the subscriber telephone 10 via subscriber interface 20.

The internet gateway 100 includes a call processor 110, a DSP manager 120, a DSP 130, a flash memory 140, and a flash memory controlling circuit 150. It should be noted that for the purpose of clarity the internet gateway 100 is shown to include only the components related to the functions of recording and reproducing the outgoing voice message. Thus, in addition to the components enumerated above, the internet gateway 100, in order to interface with the internet highway, includes other components that are not the subject matter of the present invention (i.e., a TCP/IP transmitter, a TCP/IP receiver, an H.225 processor, a socket interface, a TCP processor, a UDP processor, an IP processor, an H.245 processor, a Q.931 processor, an internet interface, and a session manager).

For the purpose of clarity, only the components directly associated with the functions of the present invention will be described hereinbelow.

The call processor 110 of the internet gateway 100 operates in accordance with the ITU-T recommendation H.323, known as "Packet Based Multimedia Communications Systems." More specifically, when an extension line or an office line is placed in a seizure state, the internet gateway 100 is informed of the seizure state and performs a call set-up and call release operations. The seizure states refers to a mode when an access line is available in response to the hook-off position of the telephone unit.

Figure 3A:
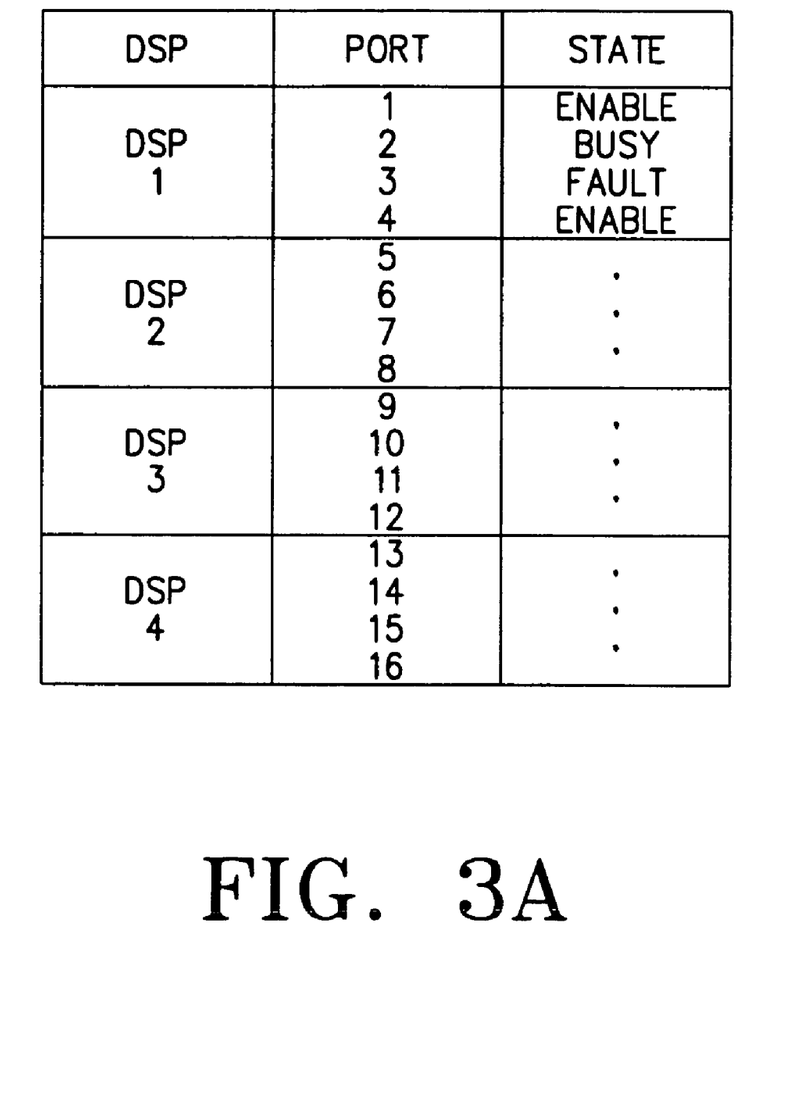
FIGS. 3A and 3B illustrate a DSP table and a call processing table of a call processor as shown in FIG. 2, respectively.
Figure 3B:
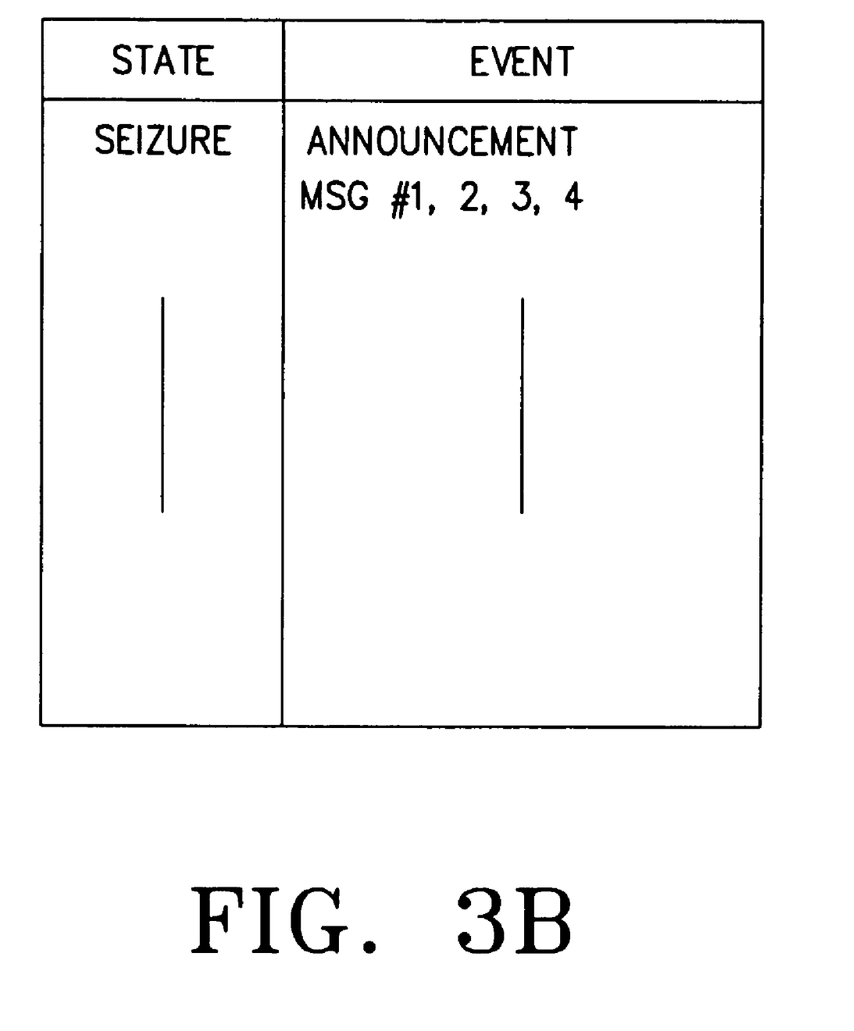

For the call set-up operation, the internet gateway 100 refers to the call processing table of the call processor 110, as shown in FIG. 3B. Upon a call request, the internet gateway 100 determines the availability of the port based on the DSP table, as shown in FIG. 3A, and transmits the port information to the DSP manager 120. The DSP manager 120 connects the available port of the DSP according to the received port information. The call processor 110 and the DSP manager 120 function to form a communication path for recording and/or reproducing a voice message. For example, an outgoing voice message can be inputted using the subscriber telephone 10, transmitted to the available port of the DSP via the interface 30, the call processor 110, and the DSP manager 120, and finally compressed and stored in the flash memory 40.

For the call processing operation, the internet gateway 100 refers to the call processing table of the call processor 110, as shown in FIG. 3B. Upon a call request, one of the events representing the voice messages is announced to the calling party in sequence. For example, the outgoing voice message stored in the flash memory 40 can be retrieved from the flash memory 140 and decompressed in the DSP 130, then transmitted to the subscriber telephone 110 or the office line subscriber via the DSP manager 120, the call processor 110, and the interface unit 30.

According to another embodiment of the present invention, a plurality of DSPs having a different number of ports can be implemented. For example, the DSP 130 may have four DSPs and each DSP can support four ports to establish the data transmitting/receiving paths, including the path for transmitting a voice message according to the present invention. The DSP 130 includes a data compressor 131, a buffer 132, and a data decompressor 133. The data compressor 131 and the data decompressor 133 compress and decompress the voice data according to the ITU-T recommendation of G.723.1 (silence compression scheme) or G.729 (reduced complexity 8 kbit/s CS-ACELP speech codec), respectively.

The compression algorithm is standardised in the ITU-T version 3/1996 and version 11/1996 and can maximise the use efficiency of a memory due to its great compression rate in comparison to the prior compression algorithm G.711.

Figure 5A:
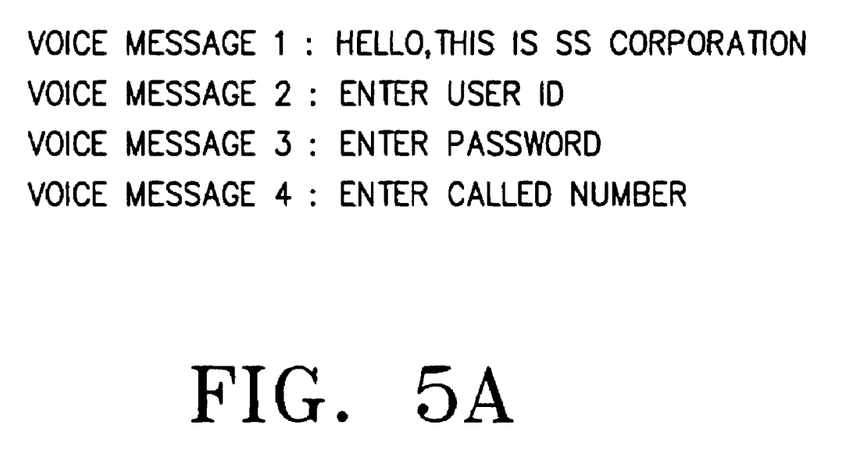
FIGS. 5A, 5B, and 5C illustrate the voice message recording operation according to the present invention; and, FIG. 6 is a flowchart depicting a voice message reproducing operation according to the present invention.
Figure 5B:
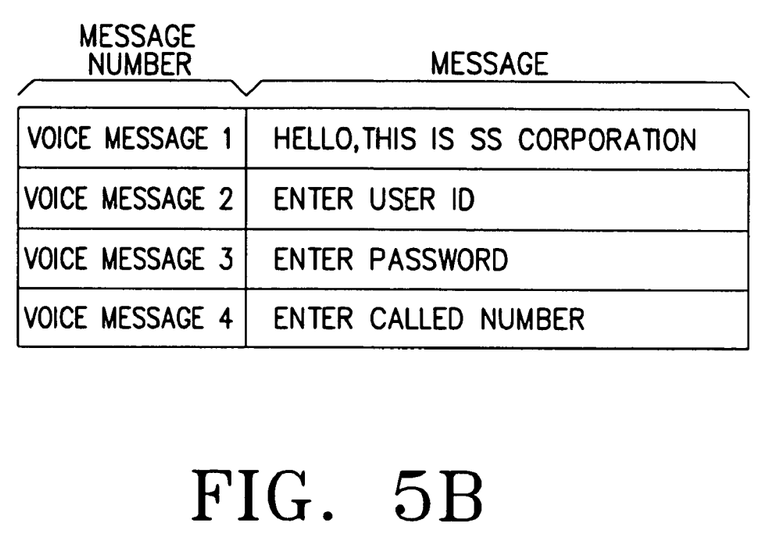
Figure 5C:
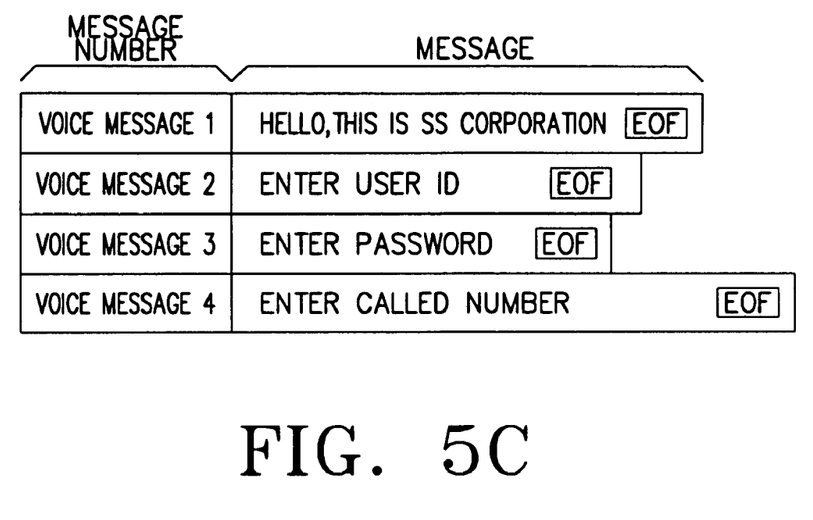

During the recording mode of the voice message, the flash memory 140 stores the data compressed by the data compressor 131 in file units. The compressed data includes a plurality of messages that are merged and EDF (End of File)-marked in file unit, one by one, as shown in FIG. 5C. During the reproducing mode of the voice message, the compressed data stored in the flash memory 140 is read, message by message, and written in the buffer 132 of the DSP 130 at a predetermined time interval (e.g., every 30 milliseconds). The operation of merging, EDF-marking, and writing of the voice messages in the buffer 132 are controlled by the flash memory controlling circuit 150. Then, the data decompressor 133 reads the voice messages, one by one, from the buffer 132 and decompresses them.

FIGS. 3A and 3B represent the DSP table and the call processing table included in the call processor unit 110 of FIG. 2, respectively. In FIG. 3A, the DSP table is divided into three areas; the first area for designating the identity of DSP; the second area for indicating the identity of port corresponding to each DSP; and the third area indicating the state of each port in terms of the enable, busy, and fault states. The enable state indicates that the port is available, the busy state indicates that the port is occupied, and the fault state indicates that there is an error in the port. The call processor 110 of FIG. 2 determines which port is available by referring to the DSP table, and the DSP manager 120 operates through the available port determined by the call processor 110.

In FIG. 3B, the call processing table is divided into an area for storing the state of port to be processed and an area for storing event messages to be announced for the available port. According to the call processing table, when the office line call or the extension call is in the seizure state, the event messages from the first to the fourth messages MGSs #1–4 are announced to the calling party. As an illustrative example, these messages MSGs #1–4 can be constructed as shown in FIGS. 5A, 5B, and 5C. More specifically, the first to the fourth messages MSGs #1–4 can be "Hello, this is SS corporation", "Enter a user ID", "Enter a password", and "Enter a called number", respectively. Thus, when a call is originated by a subscriber, the first to the fourth messages MSGs #1–4 can be sequentially announced to the calling subscriber in accordance with the call processing table.

Figure 4:
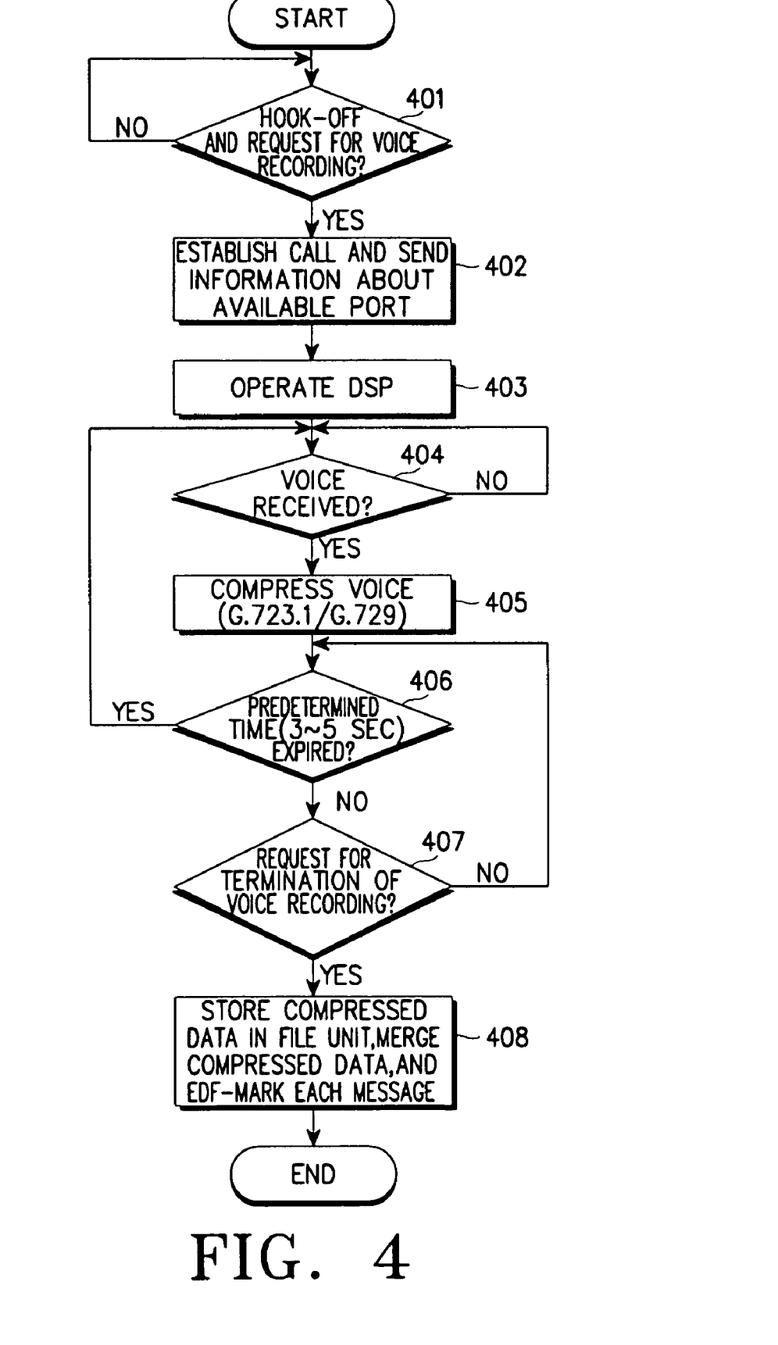
FIG. 4 is a flowchart depicting a voice message recording operation according to the present invention.

The process of recording voice messages by a subscriber is illustrated in FIG. 4. However, FIG. 4, and FIGS. 5A through 5C are shown as an exemplary application for recording voice messages as an outgoing message to be announced to the calling party. When the extension subscriber A of FIG. 2 hooks-off the telephone 10 and requests for recording an outgoing voice message using the key pad on the telephone. At step 401, the call processor 110 of the internet gateway 100 determines whether the subscriber A hooks-off the telephone 10 and requests for voice recording service. At step 402, the call processor 110 establishes a call connection between the telephone 10 and the internet gateway 100 through the subscriber interface 20 and the interface 30, determines which port of the DSP 130 is available from the DSP table as shown in FIG. 3A, and notifies the DSP manager 120 of the available port. The available port is indicated by the "enable" state in the DSP table, and the DSP manager 120 activates the available port of the DSP 130 based on the received port information, in step 403.

Step 404 determines whether the subscriber voice is received. Upon the receipt of a subscriber voice, the data compressor 131 of the DSP 130 compresses the subscriber voice based on one of the algorithm set forth in G.723.1 or G.729, in step 405. The voice compression continues until it is determined that the subscriber requests for the termination of the voice recording session. After recording the first message, the subscriber can enter the next voice message after the expiration of a predetermined time—for example, 3 to 5 seconds—in step 406. This predetermined time interval is required to compress the subscriber voice, message by message. For example, if the subscriber enters the first message shown in FIG. 5A, "Hello, this is SS corporation" the first message is compressed. Then, if the second message, "Enter a user ID" is received after the expiration of the predetermined time interval, the second message is compressed. In this sequential manner, the third and fourth messages, "Enter a password" and "Enter a called number" are compressed and recorded.

As described in the above steps, the subscriber can enter a plurality of voice messages, and each of the voice messages is compressed, one by one. Upon receiving a request for terminating the voice recording session via the key pad of the telephone 10 in step 407, the compressed voice messages are stored in the file, in step 408. Upon such request, the voice data is compressed by the data compressor 131 and stored in the file as an outgoing voice messages in the flash memory 140, as shown in FIG. 5B, then each message in the file is ENF-marked, in step 408. In step 408, the merging and EDF-marking are implemented for each message to exhibit electronic file characteristics. The merging is a process of removing the remaining unoccupied portion of the message area and the EDF marking is a process of marking EDF to distinguish one message from another message. The voice data compressed by the data compressor 131 is stored in the flash memory 140 and each message is merged and marked with EDF by the flash memory controlling circuit 150.

As described above, the subscriber voice can be recorded as an outgoing voice message in the flash memory 140 of the internet gateway 100. When an extension subscriber or an office line subscriber hooks-off a telephone and seizes an extension line or an office line, the outgoing voice message can be reproduced from the flash memory and transmitted to the extension or the office line subscriber. That is, in response to an incoming call to the exchange system, the voice message is reproduced from the flash memory 140 and announced to the corresponding calling subscriber.

Figure 6:
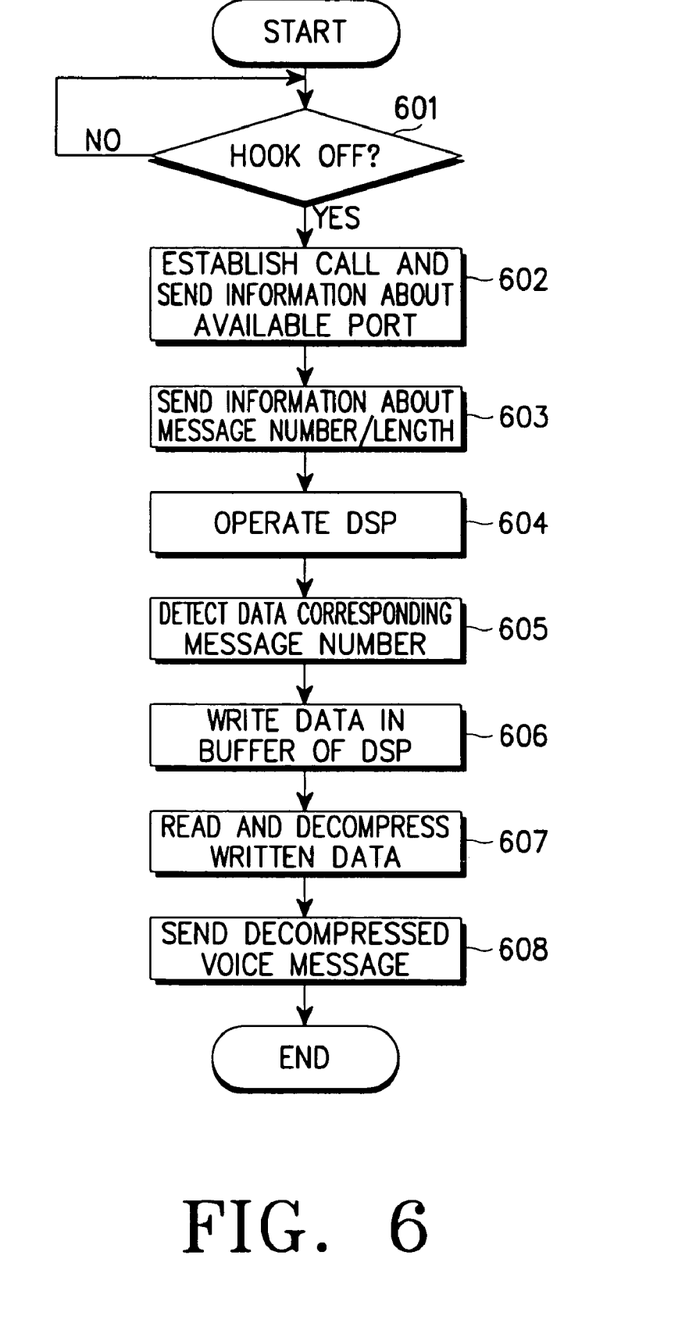

The processing of reproducing the voice messages including the outgoing voice message is illustrated in FIG. 6. The call processor 110 of the internet gateway 100 detects for the hook-off state of the office line subscriber, in step 601. At step 602, the call processor 110 establishes a call connection between the internet gateway 100 and the office line subscriber through the interface 30 and the system call processor 40 determines which port of the DSP 130 is available referring to the DSP table, as shown in FIG. 3A, and feeds the port information to the DSP manager 120. Further, the call processor 110 determines the event corresponding to the seizure of the office line referring to the call processing table shown in FIG. 3B, which contains the message number and length of voice messages to be announced based on the event, and transmits the information about the message number and length to the DSP manager 120, in step 603. At step 604, the DSP manager 120 operates the available port of the DSP 130 according to the received port information.

At step 605, the data corresponding to the message number is detected from the flash memory 140. The detected data is stored in the buffer 132 of the DSP 130 at a predetermined time interval, for example, every 30 milliseconds, in step 606. The data decompressor 133 of the DSP 130 reads the message from the buffer 132 and decompresses it using one of the algorithms set forth in G.723.1 or G.729, in step 607. The decompressed message is sent to the office line subscriber via the DSP manager 120, the call processor 110, the interface 30, and the system call processor 40, in step 608. Therefore, the exchange system having the internet gateway 100 can broadcast the outgoing voice message and other previously stored voice messages to the calling subscriber as shown in the above process.

In accordance with the present invention, since the voice message to be announced is recorded and reproduced using the internet gateway having a DSP and a flash memory, there is no need for separately procuring the VMS, thereby eliminating the economic constraints and installation inconvenience. In addition, the efficient use of the memory can be experienced by incorporating one of the algorithms set forth in G.723.1 or G.729 when recording the voice message.

While there have been illustrated and described what are considered to be the preferred embodiments of the present invention, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for recording/reproducing a voice message in response to an incoming call to an exchange system, said apparatus comprising:
    at least one subscriber unit for entering said voice message; and
    an internet gateway arranged within an exchange system for recording/reproducing said voice message, said internet gateway comprising:
    (i) a digital-signal-processor (DSP) having a plurality of ports as data communicating paths, said digital signal processor having buffer, a data compressor for compressing said voice message, and a data decompressor for decompressing said voice message stored in said buffer, and for outputting said voice message via one of said plurality of port;
    (ii) a call processor for establishing a call connection between said subscriber unit and said internet gateway in response to said incoming call and for outputting port information indicating an available port among said plurality of ports;
    (iii) a DSP manager coupled to said call processor for activating said available port of said digital-signal-processor in response to said port information;
    (iv) a flash memory for storing said compressed voice message; and,
    (v) a controlling circuit coupled to said flash memory for controlling the stored characteristics of said compressed voice message to be stored in said flash memory and for retrieving said voice message stored in said flash memory in said buffer in response to said incoming call from said telephone unit.

2. The apparatus as set forth in claim 1, wherein said data compressor and said data decompressor, respectively, compresses and decompresses said voice message according to one of the algorithms set forth in G.723.1 and G.729.

3. The apparatus as set forth in claim 1, wherein said voice message corresponds to a plurality of voice messages.

4. The apparatus as set forth in claim 3, wherein said controlling circuit stores said compressed voice message, one by one, in a file in said flash memory in response to a request signal from said subscriber unit for terminating the recording of said voice message.

5. The apparatus as set forth in claim 4, wherein said controlling circuit merges said compressed voice message stored in said flash memory.

6. The apparatus as set forth in claim 5, wherein said controlling circuit marks each said compressed voice message stored in said flash memory to indicate the end of said file.

7. The apparatus as set forth in claim 1, wherein said controlling circuit periodically controls the movement of said voice message from said flash memory to said buffer in response to said incoming call.

8. The apparatus as set forth in claim 7, wherein said controlling circuit retrieves said voice message from said flash buffer at every 30 milliseconds.

9. An apparatus for recording a voice message to be announced in response to an incoming call to an exchange system, said apparatus comprising:
    at least one subscriber unit for entering said voice message; and
    an internet gateway arranged within an exchange system for recording said voice message, said internet gateway comprising:
    (i) a digital-signal-processor(DSP) having a plurality of ports as data communicating paths, said digital signal processor having a data compressor for compressing said voice message;
    (ii) a call processor for establishing a call connection between said subscriber unit and said internet gateway in response to said incoming call and for outputting port information indicating an available port among said plurality of ports;
    (iii) a DSP manager coupled to said call processor for activating said available port of said digital-signal-processor in response to said port information;
    (iv) a flash memory for storing said compressed voice message; and,
    (v) a controlling circuit coupled to said flash memory for controlling the stored characteristics of said compressed voice message to be stored in said flash memory.

10. The apparatus as set forth in claim 9, wherein said data compressor compresses said voice message according to one of the algorithms set forth in G.723.1 and G.729.

11. The apparatus as set forth in claim 9, wherein said voice message corresponds to a plurality of voice messages.

12. The apparatus as set forth in claim 11, wherein said controlling circuit stores said compressed voice message, one by one, in a file in said flash memory in response to a request signal from said subscriber unit for terminating the recording of said voice message.

13. The apparatus as set forth in claim 12, wherein said controlling circuit merges said compressed voice message stored in said flash memory.

14. The apparatus as set forth in claim 13, wherein said controlling circuit marks each said compressed voice message stored in said flash memory to indicate the end of said file.

15. An apparatus for reproducing a voice message in response to an incoming call to an exchange system, said apparatus comprising:
   at least one subscriber unit; and
   an internet gateway arranged within an exchange system for playing said voice message stored therein in response to said incoming call, said internet gateway comprising:
   (i) a flash memory for storing said voice message having at least one message;
   (ii) a digital-signal-processor having a plurality of ports, a buffer and a data decompressor for decompressing said voice message stored in said buffer, and for outputting said decompressed voice message via one of said plurality of port;
   (iii) a controlling circuit coupled to said flash memory for retrieving said voice message stored in said flash memory in said buffer and for storing said retrieved voice message in said buffer in response to said incoming call from said telephone unit;
   (iv) a call processor for establishing a call connection between said subscriber unit and said internet gateway in response to said incoming call from said telephone unit, for outputting port information indicating an available port among said plurality of ports of said digital-signal-processor, and for outputting said voice message responsive to said incoming call; and,
   (v) a DSP manager coupled to said call processor for activating said available port of said digital-signal-processor in response to said port information.

16. The apparatus as set forth in claim 15, wherein said data decompressor decompresses said voice message according to one of algorithms set forth in G.723.1 and G.729.

17. The apparatus as set forth in claim 16, wherein said controlling circuit periodically controls the movement of said voice message from said flash memory to said buffer in response to said incoming call.

18. The apparatus as set forth in claim 17, wherein said controlling circuit retrieves said voice message from said flash buffer at every 30 milliseconds.

19. The apparatus according to claim 1, wherein the exchange system comprises a private automatic branch exchange (PABX) without requiring a separate voice mail system (VMS) to be in communication with said PABX.

20. The apparatus according to claim 9, wherein the exchange system comprises a private automatic branch exchange (PABX) without requiring a separate voice mail system (VMS) to be in communication with said PABX.

21. The apparatus according to claim 15, wherein the exchange system comprises a private automatic branch exchange (PABX) without requiring a separate voice mail system (VMS) to be in communication with said PABX.

* * * * *